United States Patent [19]

Patel

[11] Patent Number: 4,982,307

[45] Date of Patent: Jan. 1, 1991

[54] THERMAL PROTECTION CIRCUIT FOR AN INTEGRATED CIRCUIT SUBSCRIBER LINE INTERFACE

[75] Inventor: Lalit O. Patel, Mesa, Ariz.

[73] Assignee: AG Communication Systems Corporation, Phoenix, Ariz.

[21] Appl. No.: 445,525

[22] Filed: Dec. 4, 1989

[51] Int. Cl.$^5$ .............................................. H02H 5/04
[52] U.S. Cl. ..................................... 361/103; 361/93; 307/310
[58] Field of Search ........................ 361/101, 103, 92; 307/310, 296.1; 323/315, 907

[56] References Cited

U.S. PATENT DOCUMENTS 4,574,205 3/1986 Nagano ............................ 361/103 X

*Primary Examiner*—Derek S. Jennings
*Attorney, Agent, or Firm*—Anthony Miologos

[57] ABSTRACT

A thermal protection circuit for an integrated circuit subscriber line interface is disclosed. The thermal protection circuit monitors the temperature of the integrated circuit and develops an output voltage signal that shuts-down the integrated circuit when a specific temperature is exceeded. The thermal protection circuit includes first and second current networks arranged to each develop first and a second currents respectively, of substantially the same value. The second current develops a reference voltage which is applied to an output transistor. When the base-emitter junction voltage of the output transistor is less than or equal to the reference voltage, the transistor begins to operate. This increases the current flowing through the first current network which is replicated in the second current network. The increased current flowing in the second current network increases the reference voltage, thereby, fully operating the output transistor and developing the output voltage signal.

8 Claims, 1 Drawing Sheet

THERMAL PROTECTION CIRCUIT FOR AN INTEGRATED CIRCUIT SUBSCRIBER LINE INTERFACE

CROSS REFERENCE TO RELATED APPLICATIONS

Cross Reference is made to the related U.S. Patent Applications entitled: "A Solid State Telephone Line Circuit," application Ser. No. 445,517, filed Dec. 4, 1989; and "A High Voltage Subscriber Line Interface Circuit," application Ser. No. 445,516, filed Dec. 4, 1989; and "A Circuit For Synthesizing An Impedance Across The Tip And Ring Leads Of A Telephone Line Circuit," application Ser. No. 445,827, filed Dec. 4, 1989; and "A Tip-Ring Short Detector and Power Shut-Down Circuit For A Telephone Line Circuit," application Ser. No. 445,824, filed Dec. 4, 1989; and "A Thermal Protection Arrangement For An Integrated Circuit Subscriber Line Interface," application Ser. No. 445,501, filed Dec. 4, 1989; and "A Control Circuit For A Solid State Telephone Line Circuit," application Ser. No. 445,826, filed Dec. 4, 1989; and "A Ring Trip Detector For A Solid State Telephone Line Circuit," application Ser. No. 445,826, filed Dec. 4, 1989; filed on the same date, and by the same assignee as this Application.

BACKGROUND OF THE INVENTION

1. Field of the Invention

The present invention relates to the field of telecommunications and, more particularly, to a thermal protection circuit for a subscriber line interface that monitors the operating temperature of the subscriber line interface circuit and annuls power dissipation when a designated temperature is reached.

2. Description of the Prior Art

Telephone line circuits are customarily found in the telephone switching system or central office of a telecommunications network. The telephone line circuit interfaces the central office to a telephone or subscriber station found at a location remote from the central office. The telephone line circuit functions to supply power or battery feed to the subscriber station via a two wire transmission line or subscriber loop and to couple the intelligence or voice signal to and from the telephone switching system.

In many presently known telephone line circuits the battery feed function has been performed by using a passive, highly balanced, split winding transformer and or inductors which carry up to 120 ma dc. This passive circuit has a wide dynamic range, passing noise-free differential signals while not overloading with the 60 Hz longitudinal induced currents. The line circuit just described, feeds dc current to the subscriber loop and also provides the voice path for coupling the voice signal between the subscriber station and the central office. The electromagnetic components of passive line circuits are normally bulky and heavy and consume large amounts of power for short subscriber loop lengths where the current fed to the subscriber station is more than necessary for equalization. Active line-feed circuits can be less bulky and require lower total power, but meeting dynamic range and precision balance requirements dictates an overly complex circuit design.

Recently, solid state replacements for the electromagnetic components of the aforementioned line circuits have been developed. Devices such as high voltage bipolar transistors and other specialized integrated circuits are being designed to replace the heavy and bulky components of the electromagnetic line circuit. Such a device is described in the *IEEE JOURNAL OF SOLID-STATE CIRCUITS*, VOL. SC-16, NO. 4, Aug. 1981, entitled, "A High-Voltage IC for a Transformerless Trunk and Subscriber Line Interface." These smaller and lighter components allow the manufacture of telephone switching systems having more line circuits per circuit card as well as decreasing the physical size of the switching system.

The solid state line circuits just described are in many instances manufactured as an Integrated Circuit (IC). Such ICs are susceptible to destruction due to high applied heat or some other abnormal condition which allows the IC to heat-up beyond its normal operating limits. Whenever an IC is subject to high-temperatures, such as, on-chip power dissipation, high working ambient temperature, or due to some faulty condition, thermal protection arrangements such as current limit circuits are used to cut power to the circuit.

In many such ICs, thermal protection circuits are employed that sense temperature or current which is subsequently converted into a voltage. This voltage is then compared with a known voltage and a switch is provided to shut-down or limit the current and power dissipation of the IC.

One such circuit is taught by U.S. Pat. No. 4,553,048. This thermal protection circuit uses a band-gap voltage circuit to generate a reference voltage that is compared with the $V_{BE}$ of a transistor. It is well known by those skilled in the art, that $V_{BE}$ has $-$ve temperature coefficient, while the reference voltage ($V_{REF}$) generated using the band-gap technique has a $+$ve temperature coefficient. At a designed temperature $V_{REF}$, will be higher than $V_{BE}$ causing a switch to turn-on, thereby shutting down the IC and limiting power dissipation.

The circuit just described has limitations in that, the generated $V_{REF}$ varies considerably due to process variation and current flow through the band-gap circuit. Further, once the temperature of IC falls back into the normal operating limit, even minor power dissipation may cause the protection circuit to shut-down the IC again, allowing the IC to go into on/off oscillation. The oscillations can inject noise into the IC. Therefore, in order to inhibit rapid turn-on and turn-off of the IC to be protected, it would be advantageous to provide hysteresis to the protection circuit. The hysteresis would allow the temperature to fall by a few degrees before allowing the IC to power-up.

Accordingly, it is an object of the present invention to provide a new and more effective thermal protection circuit that will effectively and efficiently sense the temperature of a solid state subscriber line interface circuit and shut-down the circuit when a designated upper limit temperature is reached.

DISCLOSURE OF THE INVENTION

The above and other objects, advantages, and capabilities are realized in a thermal protection circuit for an integrated circuit subscriber line interface that includes a supply voltage input terminal, a ground reference terminal and a voltage output terminal.

The circuit further includes, a first current network for conducting a first current, comprising a first resistor connected between the supply voltage input terminal and a first transistor. A second resistor is connected to the first transistor and a second transistor is connected to the second resistor and to the ground reference terminal. Finally, a third resistor is connected to the second resistor and the ground reference terminal parallel to the second transistor.

A second current network for conducting a second current comprises a fourth resistor, connected between the supply voltage input terminal and a third transistor. A fifth resistor is connected to the third transistor and to the ground reference terminal. The fourth resistor and the third transistor of the second current network are identical to the first resistor and first transistor of the first current network. The first and the second currents developed by the first and second current networks are substantially of the same value.

The circuit of the present invention further includes a fourth transistor identical to the second transistor connected across the fifth resistor. The fourth transistor includes the output voltage terminal. The fifth resistor in response to the second current flowing through the second current network, develops and applies to the fourth transistor a reference voltage. The fourth transistor is arranged to receive the reference voltage and begin to operate when the fourth transistor's base-emitter voltage is less than or equal to the reference voltage. Since the fourth transistor and the second transistor are identical and matched, the second transistor also begins to operate. When the second transistor begins to operate, the current flowing through the first current network increases. The current flowing in the first current network is replicated by the second current network. The increased current in the second current network, increases the reference voltage developed by the fifth resistor, thereby, causing the fourth and the second transistors to fully operate providing a output voltage signal at the voltage output terminal.

BRIEF DESCRIPTION OF THE DRAWINGS

A better understanding of the invention may be had from the consideration of the following detailed description taken in conjunction with the accompanying drawings in which.

DESCRIPTION OF A PREFERRED EMBODIMENT

Figure 1:
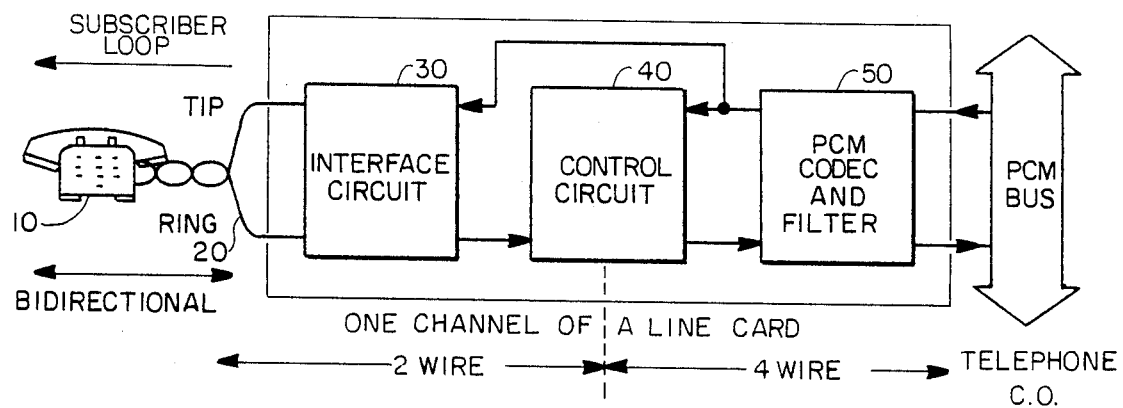
FIG. 1 is a block diagram of a solid state telephone line circuit.

Directing attention first to FIG. 1, a broad level block diagram of a solid state telephone line circuit is shown. The line circuit is shown driving a subscriber station or telephone 10, via a subscriber loop 20. The subscriber loop 20 is comprised of a twisted two wire (2W) loop pair having a tip and a ring lead. The 2W loop is connected from the subscriber station 10 to a High Voltage Subscriber Line Interface Circuit (HVSLIC) 30. HVSLIC 30 feeds a −48 V dc voltage to the subscriber loop across the tip and ring leads from a central office battery (not shown). The HVSLIC 30 further functions to superimpose a voice signal on the dc feed voltage and also feed ringing current to subscriber loop 20 for signalling. The HVSLIC 30 still further functions to provide the 2W to 4W (four wire) hybrid function of splitting the balanced signal on the tip and ring leads into separate transmit and receive paths that are ground referenced.

The control circuit 40 works in conjunction with the HVSLIC 30 to provide the dc loop current shaping and the line balance impedance portion of the 2W to 4W hybrid function. The control circuit 40 further controls various detection functions, such as, ring trip detection and loop sense detection, as well as, providing a logic interface to the central controller of the central office switching system.

Most modern digital telephone switching systems use Pulse Coded Modulation (PCM) digital data to convey voice traffic through the central office switching system. Therefore, some method of signal translation is required to convert the analog voice signals received by the interface circuit 30 to PCM digital data. This is typically accomplished by a PCM codec and filter circuit such as shown at 50. These devices are commercially <available as a so called CODEC/FILTER COMBO TM from various manufacturers. Such as the TP30XX family of COMBO TM devices manufactured by the National Semiconductor Company. Analog voice data from subscriber station 10 is processed by the PCM codec 50 and applied to the PCM bus of the central office switching system for transmission to its destination. Similarly, the codec 50 receives PCM data from the switching system and converts the PCM data into analog signals which are superimposed on the dc feed voltage of the subscriber loop 20.

The three solid state circuits 30, 40 and 50 just described, in combination embody a complete solid state line circuit adapted to connect a single subscriber station to a central office switch.

Figure 2:
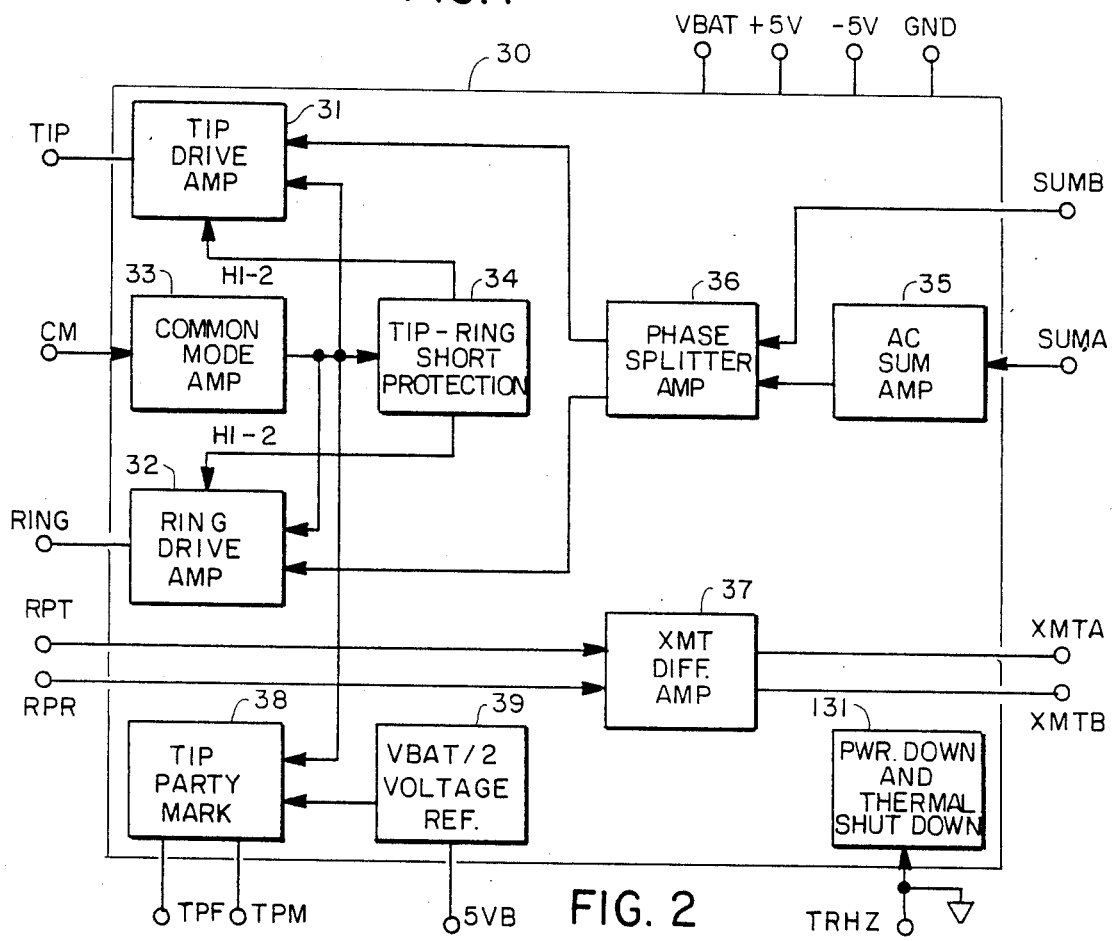
FIG. 2 is a block diagram of the high voltage subscriber line interface circuit were the Thermal Protection Circuit, in accordance with the present invention, is used to advantage.

Referring now to FIG. 2, a broad level explanation of the functions of HVSLIC 30, in accordance with the present invention, will now be given. The HVSLIC 30 shown in FIG. 2, is constructed as a bipolar integrated circuit. All signals requiring high voltages and currents are interfaced by this device. With the addition of a few external discrete components a complete transformerless line interface can be constructed.

The Tip Drive Amplifier circuit 31 and Ring Drive Amplifier circuit 32 function to feed dc and ac voltages and currents to the TIP and RING leads respectively of subscriber loop 20. Voltage input into each amplifier 31 and 32 is converted into output current at the TIP lead and RING lead respectively, of HVSLIC 30. The gain of each amplifier circuits 31 and 32 is set by using four precisely matched internal resistors and one precision external resistor (not shown). Each amplifier circuit 31 and 32 is capable of sourcing or sinking current depending on the input voltage.

The tip and ring amplifier circuits 31, 32 are connected to a Common-Mode Amplifier circuit 33. Amplifier circuit 33 is used to sense the voltage across the subscriber loop 20 and to amplify the voltage by a factor of 3.33. The output of amplifier circuit 33 is fed to amplifier circuit 31 and Amplifier circuit 32. Amplifier circuit 33 is dc biased at one half of the central office battery (Vbat) or VB/2. The Common-Mode Amplifier circuit 33 primarily functions to synthesize a longitudinal (common-mode) input impedance at the TIP and RING terminals of HVSLIC 30 that is a virtual ac ground.

Amplifier circuits 31, 32 and 33 are further connected to a Tip-Ring Short Protection circuit 34. Circuit 34 functions as a detector, which monitors the output of the Common-Mode Amplifier circuit 33. If the output of amplifier circuit 33 is 7.75 volts or closer to either ground or Vbat, the detector places amplifier circuits 31 and 32 into a high impedance mode. This condition represents a combined short of the TIP and/or RING leads to ground or Vbat. When in this short condition, the Tip Drive Amplifier circuit 31 and Ring Drive Amplifier circuit 32 are turned off to remove drive current from the subscriber loop 20.

AC Sum Amplifier circuit 35 functions to sum the receive voice signals with the transmit voice signals. Amplifier circuit 35 provides a ground referenced summing node at the SUMA terminal of HVSLIC 30. The transmit voice signals are fed to amplifier circuit 35 to synthesize an input impedance of 900 ohms at 2.16 μf at the TIP and RING terminals.

The AC Sum Amplifier circuit 35 is connected to Phase Splitter Amplifier circuit 36. The Phase Splitter Amplifier circuit 36 performs two functions. First, it sums a dc control signal from the control circuit 40 applied to terminal SUMB, with the summed receive and transmit voice signals output by amplifier circuit 35. Second, it level shifts and balances the now combined signals about VB/2 and applies the signals to two output leads. The signals output from the each of the two output leads of amplifier circuit 36 are equal in amplitude, but 180 degrees out of phase with each other. One of the output leads of amplifier circuit 36 is connected to the Tip Drive Amplifier circuit 31 and the other to the Ring Drive Amplifier circuit 32.

The XMT Differential amplifier 37 functions to amplify the voltage difference between the TIP lead and the RING lead of the subscribers loop 20 and applied to terminals RPT and RPR, respectively. These voltage differences which are analogous to the transmit voice signals are amplified and converted into a single ended output by amplifier circuit 37. The single ended voice signals output from amplifier circuit 37 are connected to terminal XMTA and applied via a coupling network (not shown) to the SUMA terminal. As explained earlier in the description of the AC Sum Amplifier circuit 35, the transmit voice signals applied to the SUMA terminal are used by amplifier circuit 35 to synthesize the input impedance at the TIP and RING terminals. The transmit voice signals from XMTA are also applied to the control circuit 40, to drive the transmit input of that circuit. A scaled down representation of the signals output from terminal XMTA is output from terminal XMTB. The signals from terminal XMTB are applied to a dc loop control circuit (not shown) on control circuit 40.

A Tip Party Mark Detector circuit 38 is connected to the common mode amplifier 33 and the VBAT/2 battery reference circuit 39. Detector 38 functions to sense a difference voltage between the output of Common-Mode Amplifier circuit 33 and the VB/2 voltage generated by circuit 39. When a difference voltage is sensed a logic signal is generated by detector 38 and applied to the TPM terminal. Under normal operating conditions, the output voltage of amplifier circuit 33 equals the VB/2 reference voltage. However, when a tip party mark is placed on line, the tip current will not equal the ring current. When the voltage from amplifier circuit 33 is sufficiently different than VB/2 the detector trips and outputs its logic signals at terminal TPM.

The VBAT/2 circuit 39 generates from the central office battery (not shown) a reference voltage which is approximately one half of the central office battery voltage input at VBAT. The VB/2 output voltage of circuit 39 is used as a reference by the Common-Mode 33, Phase-Splitter 36 and XMT Differential 37 amplifiers, as well as the Tip-Ring Short Protection circuit 34. A scaled down voltage output is generated by circuit 39 and output from the SVB terminal. This output is used by the aforementioned dc loop control circuit of control circuit 40.

Finally, a Power Down and Thermal Shut-down circuit 131 is included which controls the power dissipation of the HVSLIC 30. The power down function of circuit 131 includes logic input controls arranged to receive logic input signals at terminal TRHZ. When the logic signal at TRHZ is a logic high or "1", all internal HVSLIC 30 amplifiers are put into a high impedance mode. The output drive current and internal bias current to all the amplifiers of HVSLIC 30 is cut off, and thus, the power consumption of HVSLIC 30 is reduced to a minimum. When a logic low or "0" is applied to TRHZ the HVSLIC 30 circuit functions normally. The thermal shut-down function of circuit 131 senses the temperature of HVSLIC 30 and cuts off drive current and internal bias current to the HVSLIC 30 amplifiers if the temperature reaches above 100 degrees C. Therefore, trimming power dissipation.

Figure 3:
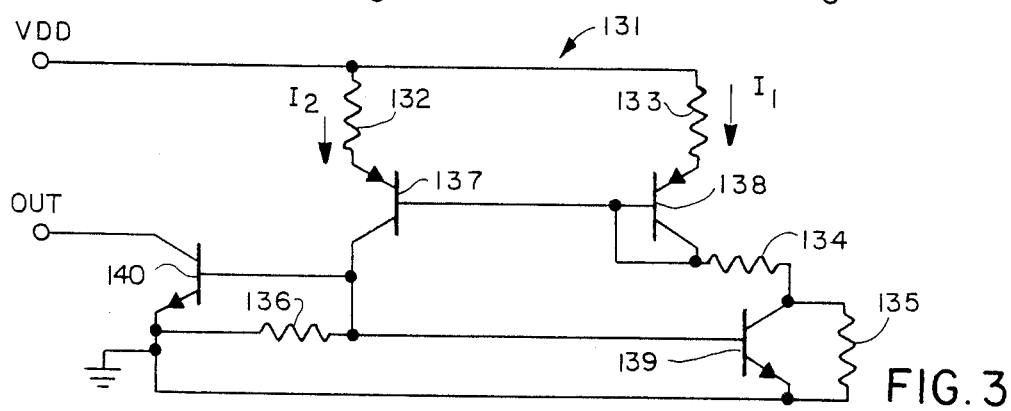
FIG. 3 is an electrical schematic showing the Thermal Protection Circuit, in accordance with the present invention.

Turning now to FIG. 3 of the included drawings, the thermal protection circuit, in accordance with the present invention, is shown.

The circuit 131 includes four transistors 137 through 140 and five resistors 132 through 136. Current $I_1$, is generated using supply voltage $V_{DD}$ and transistor 138 and resistors 133, 134 and 135. Current $I_1$ flows from $V_{DD}$ through resistor 133 (R2), transistor 138 (Q2), and resistors 134 (R3) and 135 (R4) to ground. Current $I_1$ can be expressed mathematically by the following formula:

$$I_1 = \frac{V_{DD} - V_{BEQ2}}{R2 + R3 + R4}$$

The reference current $I_1$, is mirrored into current $I_2$ by using transistor 137 ($Q_1$) and resistor 132 (R1), which are closely matched with transistor 138 and resistor 133. Current $I_2$ flows through resistors 132 (R1) and 136 (R5). Therefore:

$$I_2 = I_1 = \frac{V_{DD} - V_{BEQ2}}{R3 + R4 + R5}$$

Since current $I_2$ flows into resistor 136, a voltage drop across resistor 136 occurs. This voltage drop ($V_{R5}$) is given as:

$$V_{R5} = I_2 R_5 = (V_{DD} - V_{BEQ2}) \frac{(R5)}{(R2 + R3 + R4)}$$

The reference voltage $V_{R5}$, is proportional to $V_{DD}$ and the ratio of resistors 136 and 133+134+135. However, $V_{R5}$ is independent of the absolute values and temperature coefficients of resistors 133 through 136.

$V_{DD}$ is an input voltage from a power supply, and is also proportional to the ratio of resistors 136 and 133+134+135. In the IC layout of circuit 131, resistor 136 is closely matched with resistors 133, 134 and 135, achieving a resistor ratio tolerance within ±0.5%. This close tolerance among resistors 133 through 136 establishes a reference voltage which will follow closely any variations in the power supply voltage. Normally, input voltage from a power supply varies within ±5%.

Circuit 131 compares the reference voltage $V_{R5}$ with the voltage at the diode junction $V_{BE}$ of transistor 140. It is well known by those skilled in the art, that the base-emitter junction voltage drop of a transistor will decrease with a rise in junction temperature. As the temperature of the HVSLIC 30 rises, the $V_{BE}$ of transistor 140 decreases. At an established design temperature, the $V_{BE}$ of transistor 140 (Q5) or $V_{BEQ5}$ will be less than or equal to $V_{R5}$. Therefore, it can be shown that at an established design temperature:

$$V_{BEQ5} \leq (V_{DD} - V_{BEQ2}) \frac{(R5)}{(R2 + R3 + R4)}$$

When the voltage of $V_{BEQ5}$ is less than or equal to the reference voltage $V_{R5}$, transistor 140 begins to turn-on. Since transistor 139 is identical to and closely matched with transistor 140, transistor 139 also begins to turn-on. As transistor 139 turns-on current $I_1$ increases. Since current $I_1$ is mirrored into current $I_2$, current $I_2$ increases, turning-on transistors 139 and 140 further. Due to this regenerative action, transistors 139 and 140 will turn-on completely giving the power turn-off signal at the collector of transistor 140. The power turn-off signal is then used to turn-off the bias currents of the devices and active circuits of the HVSLIC 30.

As HVSLIC 30 cools down by a few degrees, the $V_{BE}$ of transistors 139 and 140 will increase starting turn-off of transistors 139 and 140. As transistor 139 begins to turn-off, current $I_1$ decreases reducing current $I_2$ and therefore, the voltage drop at resistor 136 ($V_{R5}$). As $V_{R5}$ decrease transistors 139 and 140 begin a more complete turn-off. Again, regenerative action turns transistors 139 and 140 off completely. Thereby, removing the power turn-off signal to the devices and active circuits of HVSLIC 30 and allowing HVSLIC 30 to resume normal operation.

It will be appreciated by those skilled in the art that transistor 139 provides circuit 131 with a hysteresis function which stabilizes the on/off condition of the power dissipation of HVSLIC 30 and circuit 131.

As can be appreciated from the above description, the circuit just described, can not only provide improved thermal protection to a subscriber line interface circuit, but may also be used to advantage on other types of monolithically integrated circuits.

It will be useful to underscore some of the salient attributes of the subject thermal protection circuit. The circuit uses a simple method for generating a reference voltage using one power source with reference to ground. The reference voltage generated is independent of absolute values of integrated (ion implanted, diffused or thin film) resistors or temperature coefficients of the circuits resistors. The temperature sensing element used by the circuit of the present invention, is a base-emitter junction diode of a transistor. The same transistor also functions to provide the on/off signal to the IC being protected. Finally, the use of transistor 139 across resistor 135, provides a simple hysteresis and regenerative circuit which provides oscillation free turn-on and turn-off of the thermal protection circuit.

It will be obvious to those skilled in the art that numerous modifications to the present invention can be made without departing from the scope of the invention as defined by the appended claims. In this context, it should be recognized that the essence of the invention resides in a thermal protection circuit for a subscriber line interface circuit having the advantages and capabilities described herein.

What is claimed is:

1. A thermal protection circuit for an integrated circuit subscriber line interface, said thermal protection circuit including a supply voltage input terminal, a ground reference terminal and a voltage output terminal, said thermal protection circuit comprising:
   a current network for conducting a first current comprising a first resistor connected between said supply voltage input terminal and a first transistor, a second resistor connected to said first transistor, a second transistor connected to said second resistor and to said ground reference terminal, and a third resistor connected to said second resistor and said ground reference terminal in parallel with said second transistor;
   a second current network for conducting a second current comprising a fourth resistor connected between said supply voltage input terminal and a third transistor, and a fifth resistor connected to said third transistor and said ground reference terminal, said fourth resistor and said third transistor identical to said first resistor and said first transistor, said first and said second current having substantially the same value;
   a fourth transistor identical to said second transistor having its base-emitter junction connected across said fifth resistor, and including said output voltage terminal; and
   said fifth resistor in response to said second current, develops and applies to said fourth transistor a reference voltage, said fourth transistor arranged to begin to operate when said fourth transistors base-emitter voltage is less than or equal to said reference voltage, turning on said second transistor and increasing said current through said first current network and said second current network, whereby, said fourth and said second transistors fully operate providing an output signal at said voltage output terminal.

2. A thermal protection circuit for a monolithic integrated circuit, said thermal protection circuit including a supply voltage input terminal and a ground reference terminal, said thermal protection circuit comprising:
   means for developing a first current connected between said supply voltage terminal and said ground reference terminal;
   means for developing a second current connected between said supply voltage terminal and said ground reference terminal, said first and said second current having substantially the same value;
   means for developing a reference voltage connected to said means for developing a second current;
   means for developing an output signal connected to said means for developing a reference voltage, said means for developing an output signal having a specific operating voltage and said means for developing an output signal is arranged to begin to operate when said operating voltage is less than or equal to said reference voltage; and
   said first current increasing responsive to said means for developing an output signal beginning to operate, said second current replicates said first current increasing said reference voltage and rendering said means for developing an output signal fully operational, whereby, said means for developing an output signal develops an output voltage.

3. The circuit as claimed in claim 2, wherein said means for developing a first current includes, a first current network comprising a first resistor connected between said supply voltage input terminal and a first transistor, a second resistor connected to said second resistor and to said ground reference terminal and a third resistor connected to said second resistor and said ground reference terminal in parallel with said second transistor, for conducting a first current from said supply voltage input terminal to said ground reference terminal.

4. The circuit as claimed in claim 3, wherein said means for developing a second current includes, a second current network comprising a fourth resistor connected between said supply voltage input terminal and a third transistor and a fifth resistor connected to said third transistor and said ground reference terminal for conducting a second current from said supply voltage input terminal to said ground reference terminal, said fourth resistor and said third transistor are identical to said first resistor and said first transistor.

5. The circuit as claimed in claim 4, wherein said first and said second currents have substantially the same value.

6. The circuit as claimed in claim 5, wherein said means for developing an output signal includes a fourth transistor identical to said second transistor having its base-emitter junction connected across said fifth resistor, said fourth transistor including a voltage output terminal; and said fifth resistor in response to said second current develops and applies to said fourth transistor a reference voltage, said fourth transistor arranged to begin to operate when said reference voltage is less than or equal to said fourth transistors base-emitter voltage, turning on said second transistor and increasing said current through said first current network and said second current replicating said first current, whereby said fourth and said second transistors operate fully providing an output signal at said voltage output terminal.

7. The circuit as claimed in claim 6, wherein said fourth transistor includes a base lead and an emitter lead and said emitter lead is connected to said ground reference terminal and said base lead is connected to said reference voltage, said fourth transistor further including a collector lead comprising said voltage output signal, said fourth transistor further arranged to monitor the temperature of said integrated circuit whereby, the voltage dropped by said fourth transistor's base-emitter junction decreases as the temperature of said integrated circuit increases.

8. The circuit as claimed in claim 7, wherein said reference voltage is applied to said fourth transistor's base lead and said fourth transistor compares said reference voltage to said voltage of said base-emitter junction and said fourth transistor begins to operate when said base-emitter junction voltage is greater than said reference voltage.

* * * * *